United States Patent [19]

Waddill et al.

[11] 4,178,427

[45] Dec. 11, 1979

[54] POLYETHER UREA EPOXY CURING AGENT

[75] Inventors: Harold G. Waddill; Heinz Schulze, both of Austin, Tex.

[73] Assignee: Texaco Development Corp., White Plains, N.Y.

[21] Appl. No.: 875,473

[22] Filed: Feb. 6, 1978

Related U.S. Application Data

[60] Continuation-in-part of Ser. No. 683,359, May 5, 1976, abandoned, which is a division of Ser. No. 555,844, Mar. 6, 1975, Pat. No. 4,002,598.

[51] Int. Cl.² ............................................. C08G 59/50
[52] U.S. Cl. ................................... 528/124; 156/327; 260/553 R; 428/418; 528/68; 528/120; 525/507; 528/367
[58] Field of Search .................. 260/47 EN, 2 N, 59, 260/18 PF, 553 R, 553 CD, 77.5 CH, 77.5 C

[56] References Cited

U.S. PATENT DOCUMENTS

| | | | |
|---|---|---|---|
| 3,436,359 | 4/1969 | Hubin | 260/77.5 CH |
| 3,591,556 | 7/1971 | Godfrey et al. | 260/47 EN |
| 3,639,338 | 2/1972 | Kuder | 260/47 EN |
| 3,931,116 | 1/1976 | Bernstein et al. | 260/77.5 CH |

*Primary Examiner*—Theodore E. Pertilla
*Attorney, Agent, or Firm*—Carl G. Ries; Thomas H. Whaley; Kenneth R. Priem

[57] ABSTRACT

An improved curable epoxy resin composition of a vicinalpolyepoxide and an effective amount of a novel polyether urea curing agent is disclosed. The improved curable epoxy resins which are useful as coatings, castings, sealants, and adhesives show improved tensile shear strength, flexural strength, and ultimate elongation. The novel polyether urea curing agents of the instant invention are characterized by terminal primary amino groups and are formed by reaction of polyoxyalkylenepolyamines with urea, urea forming compounds, or bifunctional isocyanates.

A preferred curing agent includes a mixture of a novel polyether urea formed by reaction of a polyoxypropylenepolyamine having a molecular weight of from about 200–2000 and an effective amount of urea; and another known epoxy resin curing agent such as polyoxyalkylenepolyamine in ratios of from about 5:1 to 1:5 by weight.

23 Claims, No Drawings

POLYETHER UREA EPOXY CURING AGENT

This application is a Continuation-In-Part of application Ser. No. 683,359 filed May 5, 1976, now abandoned which is a divisional of application Ser. No. 555,844, filed Mar. 6, 1975, now U.S. Pat. No. 4,002,598.

BACKGROUND OF THE INVENTION

1. Field of the Invention

This invention relates to curable epoxy resins and more particularly to epoxy resins containing certain polyether urea curing agents having terminal primary amino groups.

2. Prior Art

Epoxy resins constitute a broad class of polymeric materials having a wide range of physical characteristics. The resins are characterized by epoxide groups which are cured by reaction with certain catalysts or curing agents to provide cured epoxy resin compositions with certain desirable properties. The most commonly used curing agents are aliphatic amines such as diethylenetriamine, triethylenetetramine and the like.

Epoxy resin compositions having improved physical properties are obtained by employing polyoxyalkyleneamines, and polyoxyalkylenediamines in particular, as curing agents. However, such epoxy resin compositions require long curing times. It is therefore common to employ with such epoxy resin compositions a co-curing agent such as those described in U.S. Pat. No. 3,549,592.

Also known to be effective as epoxy resin curing agents or co-curing agents are various ureas and substituted ureas, such as those disclosed in U.S. Pat. No. 3,294,749, U.S. Pat. No. 2,713,569, U.S. Pat. No. 3,386,956, U.S. Pat. No. 3,386,955, U.S. Pat. No. 2,855,327 and U.S. Pat. No. 3,639,338. However, for certain resin applications where high ultimate elongation is required, none of the above curing agent compositions have been entirely adequate.

It has now been found that certain polyether ureas having terminal primary amino groups, when employed as epoxy curing agents provide cured epoxy resin compositions exhibiting outstanding physical properties. Specifically, epoxy resin formulated with these curing agents and cured, will provide an epoxy resin with high tensile shear strength, high flexural strength and high ultimate elongation thus alleviating the previously mentioned disadvantages. Such cured epoxy resin compositions are useful as coatings, castings, sealants and adhesives.

SUMMARY OF THE INVENTION

According to the broader aspects of the invention, an improved curable epoxy resin composition includes a vicinalpolyepoxide and an effective amount of a novel curing agent of a polyether urea having terminal primary amino groups. The novel polyether urea curing agent can be depicted by the general formula:

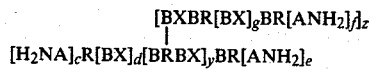

wherein A is a polyoxyalkylene radical containing from about 1 to 15 oxyalkylene groups, B is a polyoxyalkylene amino radical containing from about 1 to 15 oxyalkylene groups, R is a hydrocarbon radical having from 2 to 5 carbon atoms and forming from 2 to 4 oxycarbon linkages with A and B, X is a C=O radical or a radical derived from a difunctional isocyanate having two

groups, c and d are from 1 to 3 chosen such that their sum is from 1 to 4, e is a number from 1 to 3, f is a number from 1 to 3, g is a number from 1 to 3, y is a number from 0 to about 5, and z is a number from 0 to 2.

According to a preferred embodiment, a curable epoxy resin composition includes an epoxy resin of the diglycidyl ether of 4,4'-isopropylidenebisphenol and an effective amount of a curing agent consisting of a mixture of the novel polyether urea containing terminal primary amino groups and a polyoxypropylenepolyamine having a molecular weight of from about 200 to 2000. According to this embodiment, the polyether urea containing terminal primary amino groups is formed by reacting a polyoxypropylenepolyamine having a molecular weight of from about 200 to 2,000 and an effective amount of urea.

According to another aspect of the invention, the novel, polyether ureas are formed by reacting a suitable polyoxyalkylenepolyamine with a urea, a urea forming compound or a bifunctional isocyanate.

DETAILED DESCRIPTION OF PREFERRED EMBODIMENT

According to a preferred embodiment, a curable epoxy resin contains a diglycidyl ether of 4,4'-isopropylidenebisphenol and an effective amount of a curing agent consisting essentially of a polyether urea formed by reacting a polyoxypropylenepolyamine having a molecular weight of about 200–2,000 with urea; and a polyoxypropylenepolyamine having a molecular weight of from about 200 to 2,000. The curable epoxy resin of this embodiment is prepared essentially in three steps. First, the polyether urea having terminal primary amino groups is prepared by charging a suitable reaction vessel with approximately 1.00 mol of a polyoxypropylenepolyamine having a molecular weight of about 400 and consisting substantially of the polyoxypropylenediamine; and from about 0.50 to 0.83 mols of urea. The mixture is then heated gradually to temperatures of about 180° to 200° C. and maintained until the evolution of ammonia has ceased. The resultant reaction mixture is then stripped at temperatures of about 120° C. to 150° C. at pressures of 1 mm Hg to form a viscous liquid.

In the second step, the viscous liquid obtained in step 1 is admixed with a polyoxypropylenepolyamine having a molecular weight of from about 200 to 2,000 in a ratio of from about 5:1 to about 1:5 by weight to produce a curing agent admixture.

In a third step, the admixture obtained in step 2 is added to a suitable amount of a diglycidyl ether of 4,4'-isopropylidene bisphenol such that the total number of equivalent terminal primary amino groups is about equal to the number of equivalents of epoxide in the epoxy resin composition. The epoxy resin and the curing mixture are thoroughly admixed with the addition of about three drops of a silicone fluid to prevent the formation of voids and bubbles. The resulting formulation, after degassing under vacuum for about 2–5 minutes, is oven cured in aluminum molds for about 2 to 5 hours at temperatures from about 80° C. to 125° C. The cured products exhibit improved tensile shear strength, flexural strength and ultimate elongation.

Generally the polyepoxide containing compositions which can be cured using the novel polyether urea curing agents of this invention are organic materials having a plurality of reactive 1,2-epoxy groups. These polyepoxide materials can be monomeric or polymeric, saturated or unsaturated, aliphatic, cycloaliphatic, aromatic or heterocyclic, and may be substituted if desired with other substituents besides the epoxy groups, e.g., hydroxyl groups, ether radicals, aromatic halogen atoms and the like.

A widely used class of polyepoxides which can be catalyzed according to the practice of the present invention includes the resinous epoxy polyethers obtained by reacting an epihalohydrin, such as epichlorohydrin, and the like, with either a polyhydric phenol or a polyhydric alcohol. An illustrative, but by no means exhaustive, listing of suitable dihydric phenols includes 4,4'-isopropylidene bisphenol, 2,4'-dihydroxydiphenylethylmethane, 3,3'-dihydroxydiphenyldiethylmethane, 3,4'-dihydroxydiphenylmethylpropylmethane, 2,3'-dihydroxydiphenylethylphenylmethane, 4,4'-dihydroxydiphenylpropylphenylmethane, 4,4'-dihydroxydiphenylbutylphenylmethane, 2,2'-dihydroxydiphenylditolylmethane, 4,4'-dihydroxydiphenyltolylmethylmethane and the like. Other polyhydric phenols which may also be co-reacted with an epihalohydrin to provide these epoxy polyethers are such compounds as resorcinol, hydroquinone, substituted hydroquinones, e.g., p-tert-butylhydroquinone, and the like.

Among the polyhydric alcohols which can be co-reacted with an epihalohydrin to provide these resinous epoxy polyethers are such compounds as ethylene glycol, propylene glycols, butylene glycols, pentane diols, bis (4-hydroxycyclohexyl)dimethylmethane, 1,4-dimethylolbenzene, glycerol, 1,2,6-hexanetriol, trimethylolpropane, mannitol, sorbitol, erythritol, pentaerythritol, their dimers, trimers and higher polymers, e.g., polyethylene glycols, polypropylene glycols, triglycerol, dipentaerythritol and the like, polyallyl alcohol, polyhydric thioethers, such as 2,2'-, 3,3'-tetrahydroxydipropylsulfide and the like, mercapto alcohols such as α-monothioglycerol, α,α'-dithioglycerol, and the like, polyhydric alcohol partial esters, such as monostearin, pentaerythritol monoacetate, and the like, and halogenated polyhydric alcohols such as the monochlorohydrins of glycerol, sorbitol, pentaerythritol and the like.

Another class of polymeric polyepoxides which can be cured by means of the above-described curing agents includes the epoxy novolac resins obtained by reacting, preferably, in the presence of a basic catalyst, e.g., sodium or potassium hydroxide, an epihalohydrin, such as epichlorohydrin, with the resinous condensate of an aldehyde, e.g., formaldehyde, and either a monohydric phenol, e.g., phenol itself, or a polyhydric phenol. Further details concerning the nature and preparation of these epoxy novolac resins can be obtained in Lee, H. and Neville, K. "Handbook of Epoxy Resins".

It will be appreciated by those skilled in the art that the polyepoxide compositions which can be cured according to the practice of the present invention are not limited to those containing the above described polyepoxides, but that these polyepoxides are to be considered merely as being representative of the class of polyepoxides as a whole.

The novel polyether urea curing agent in accordance with the instant invention are those polyethers ureas having terminal primary amino groups depicted by the following formula:

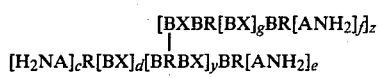

wherein A is a polyoxyalkylene radical containing from about 1 to about 15 oxyalkylene groups wherein each oxyalkylene group contains from 2 to about 4 carbon atoms; R is a hydrocarbon radical having from 2 to 5 carbon atoms forming from 2 to 4 oxycarbon linkages with A and B; B is a polyoxyalkylene amino radical containing from about 1 to 15 oxyalkylene groups wherein each oxyalkylene group contains from 2 to about 4 carbon atoms; X is a C=O radical or a radical derived from a difunctional isocyanate having two

groups; c and d are from 1 to 3 chosen such that their sum is 2 to 4; e is a number from 1 to 3; f is a number from 1 to 3; g is a number from 1 to 3; y is a number from 0 to about 5; z is a number from 0 to 2. It will be realized by those skilled in the art that some terminal groups may be of the form

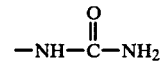

when urea is used to supply the C=O radical because of the incomplete condensation.

Preferably the polyureas of the instant invention are those depicted by the above formula wherein A corresponds to the formula:

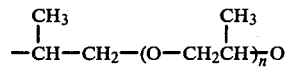

wherein n is a number from 0 to 15 and preferably a number from 1 to 10, B corresponds to formula:

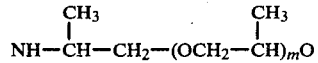

wherein m is a number from 0 to 15 and preferably a number from 1 to 10, c and d are from 1 to 2 chosen such that their sum is from 2 to 3, e is a number from 1 to 2, g is a number from 1 to 2, f is a number from 1 to 2, z is a number from 0 to 1, y is a number from 1 to 4, and X is a C=O radical.

The most preferred polyurea curing agent is that composition formed by reacting from about 2.0 mols to about 1.2 mols of polyoxypropylenepolyamine having a molecular weight of about 200 to about 400 with 1 mol of urea at temperatures from about 100° to about 200° C.

The polyether ureas of this invention can be formed by reaction of a polyoxyalkylenepolyamine wherein the alkylene contains from 2 to about 4 carbon atoms with urea, a urea forming compound or an organic bifunctional isocyanate.

A preferred class of polyoxyalkylenepolyamines useful in forming the polyether ureas of the instant invention may be depicted by the formula:

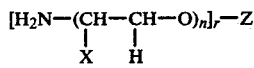

wherein X is hydrogen, a methyl radical or an ethyl radical; Z is a hydrocarbon radical having 2 to 5 carbon atoms forming from 2 to 4 external ether linkages; n is a number from 1 to about 15 and r is a number from 2 to 4. The most preferred polyoxyalkylenepolyamines are the polyoxypropylenediamines wherein X is a methyl radical, n is a number from 1 to 10, Z is a 1,2-propylene radical and r is about 2. These polyoxyalkylenepolyamines can be prepared by known methods as disclosed in U.S. Pat. No. 3,236,895 and U.S. Pat. No. 3,654,370.

Whenever urea is employed as the reactant, the reaction proceeds with the evolution of ammonia and the terminal primary amino group of the polyoxyalkylenepolyamine is converted to a ureido group. The functionality of the polyoxyalkylenepolyamine is dependent upon the number of terminal primary amino groups. Since urea itself is bifunctional, each molecule of urea can react with two terminal amino groups of the polyoxyalkylenepolyamine. Consequently, it is possible to form polyureas in which the polyether urea unit repeats in the molecular structure.

While urea is the preferred reactant, other urea forming compounds may be utilized within the scope of the invention to supply the linking

radical. Since the polyoxyalkylenepolyamine reactant already contains terminal primary amino groups, compounds such as carbonyl diimidazole, phosgene, and diphenyl carbonate may be used to supply the

radical to form ureido linkages without the liberation of ammonia.

Hubin's U.S. Pat. No. 3,436,359 is an example of art which does not disclose the diamines and higher polyamines used by applicant in this invention. In Example 15 of Hubin, he speaks of using the polyether polyprimary polyamines of Example 4 (line 37-38 of column 13). Referring to Example 4 which shows the amines used in Example 15, it is evident that the percent conversion in Example 4 is only 49%. Therefore, the amine produced is not a diamine but simply a monoamine with a hydroxyl group at the other terminal point of the molecule. Thus, the amines that Hubin uses in Example 15, are actually monoamines and, therefore, completely unlike the diamines and polyamines of Applicant's invention.

Another class of polyether polyureas which are useful in the practice of this invention, are formed by reaction of polyoxyalkylenepolyamines with a bifunctional organic isocyanate obtained for instance from the phosgenated condensation product of aniline and formaldehyde. One suitable compound can be represented by the formula:

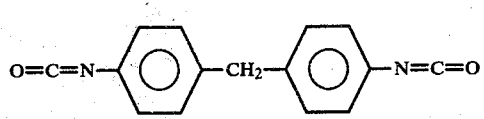

or the isomers thereof such as 2,4'-diphenylmethanediisocyanate. Mixtures of the isomers can also be used:

While it is satisfactory to employ the polyether urea curing agents of the instant invention as the sole curing agent in the epoxy resin composition, in one modification of this invention these polyether urea curing agents are preferably employed in combination with an amine curing agent conventionally employed in curing epoxy resin compositions. Suitable amine co-curing agents include aliphatic polyamines, such as diethylenetriamine and triethylenetetramine; and aromatic polyamines such as methylenedianiline, etc. Polyoxyalkylenediamines of the type hereinbefore described are preferable co-curing agents. It has been found that ratios of polyether urea or polyether polyurea to amine co-curing agent of from about 5:1 to about 1:5 produce cured epoxy resin compositions with significantly improved properties, for example, tensile shear strength, flexural strength and ultimate elongation.

The amount of polyether urea or polyether urea-amine curing agent admixture which is employed in curing polyepoxide compositions will depend on the amine equivalent weight of the curing agent employed. The total number of equivalents of amine group is preferably from about 0.8 to about 1.2 times the number of epoxide equivalents present in the curable epoxy resin composition with a stoichiometric amount being most preferred.

Various conventionally employed additives can be admixed with these catalyzed polyepoxide-containing compositions prior to final cure. For example, in certain instances it may be desired to add minor amounts of other co-catalysts, or hardeners, along with the curing agent systems herein described. Conventional pigments, dyes, fillers, flame-retarding agents and other compatible natural and synthetic resins can also be added. Furthermore, known solvents for the polyepoxide materials such as acetone, methyl ethyl ketone, toluene, benzene, xylene, dioxane, methyl isobutyl ketone, dimethylformamide, ethylene glycol monoethyl ether acetate, and the like, can be used if desired, and where necessary.

The polyether urea catalyzed polyepoxide-containing compositions can be used in any of the applications for which polyepoxides are customarily used, e.g., as adhesives, impregnants, surface coatings, potting and encapsulating compositions, in laminates and, particularly, as adhesives for bonding metallic elements or structures together.

The use of the polyether ureas and polyether polyurea of this invention will now be further illustrated in the following examples which are for purposes of illustration and should not be considered a limitation of the scope of the invention.

EXAMPLE 1

Into a reaction vessel were added 3,618 g. (9.0 moles) of a polyoxypropylenepolyamine having a molecular weight of approximately 400 and an analysis of 4.98 meq. primary amine/g-5.0 meq. total amine/g. sold under the name "JEFFAMINE ® D-400" by Jefferson Chemical Co., Austin, Texas 78751, and 270 g. of urea (4.5 moles). The mixture was heated gradually to 198° C. and maintained at this temperature until the evolution of ammonia ceased. The reaction mixture was then stripped at 130° C. at a pressure 1 mm Hg. A viscous liquid polyether-urea having terminal primary amino groups was obtained having an osmometric molecular weight of 650 and which analyzed as follows: 6.6% N, 2.3 meq total amine/g., 2.20 meq primary amine/g.

EXAMPLE 2

According to the procedure of Example 1, 3,618 g. (9.0 moles) of a polyoxypropylenepolyamine sold under the name "JEFFAMINE® D-400" by Jefferson Chemical Co., Austin, Texas 78751 was reacted with 390 g. (6.5 moles) of urea. A viscous polyether-urea having terminal primary amino groups was obtained having an osmometric molecular weight of approximately 1100 and which analyzed as follows: 6.57% N, 1.26 meq total amine/g., 1.23 meq primary amine/g.

EXAMPLE 3

According to the procedure of Example 1, 3,618 g. (9.0 moles) of a polyoxypropylenepolyamine sold under the name "JEFFAMINE® D-400" by Jefferson Chemical Co., Austin, Texas 78751 was reacted with 450 g. of urea (7.5 moles). A viscous polyether-urea having terminal primary amino groups was obtained having an osmometric molecular weight of approximately 1720 and which analyzed as follows: 6.19% N, 0.91 meq total amine/g., 0.71 meq primary amine/g.

EXAMPLE 4

According to the procedure of Example 1, 2,916 g. (2.0 moles) of a polyoxypropylenepolyamine having a molecular weight of approximately 240 and an analysis of 8.23 meq primary amine/8.45 meq total amine/g. sold under the name "JEFFAMINE ® D-230" by Jefferson Chemical Co., Austin, Texas 78751, was reacted with 360 g. (6.0 moles) of urea. The reaction product was then stripped at 100° C. and a pressure of 1.0 mm Hg. The polyether-urea having terminal primary amino groups had an osmometric molecular weight of 440 and analyzed as follows: 11.47% N, 4.27 meq primary amine/g.

EXAMPLE 5

According to the procedure of Example 1, 2,270 g. (1.0 moles) of a polyoxypropylenepolyamine having a molecular weight of approximately 2,300 (analysis: 0.88 meq primary amine/g) was reacted with 30 g. (0.5 moles) of urea. The reaction product was then stripped at 100° C. and a pressure of 0.5 mm Hg. The polyether-urea having terminal primary amino groups analyzed as follows: 1.18% N, 0.43 meq primary amine/g.

EXAMPLE 6

In a reaction vessel under an inert atmosphere, 402 g. (1.0 mol) of a polyoxypropylenepolyamine sold under the name "JEFFAMINE® D-400" by Jefferson Chemical Co., Austin, Texas 78751 was heated to 170° C. with vigorous stirring. The heat source was then removed and 66 g. (0.5 meq) of a polyisocyanate obtained by phosgenation of an aniline-formaldehyde condensate (7.56 meq NCO/g.) was added to the amine over a period of 5 minutes. The reaction mixture was then heated to 245°-250° C. and maintained at that temperature for 15 minutes. The reaction mixture was then cooled. The polyether-urea having terminal primary amino groups was found to have an osmometric molecular weight of 560 and analyzed as follows: 7.35% N, 2.71 meq primary amine/g.

EXAMPLE 7

According to the procedure of Example 6, 406 g. (1.0 mol) of a polyoxypropylenepolyamine sold under the name "JEFFAMINE ® D-400" by Jefferson Chemical Co., Austin, Texas 78751 was reacted with 99 g. (0.75 meq) of the same polyisocyanate described in Example 6. The resulting polyether-urea having terminal primary amino groups has an osmometric molecular weight of 690 and analyzed as follows: 7.58% N, 2.03 meq primary amine/g.

EXAMPLE 8

According to the procedure of Example 6, 402 g. (1.0 mol) of a polyoxypropylenepolyamine sold under the name "JEFFAMINE ® D-400" by Jefferson Chemical Co., Austin, Texas 78751 was reacted with 132.5 g. (1.0 meq) of the same polyisocyanate described in Example 6. The resulting polyether-urea having terminal primary amino groups was almost solid at ambient temperature and had an osmometric molecular weight of 960. The product analyzed as follows: 7.85% N, 1.61 meq primary amine/g.

To illustrate the advantage of the polyether urea curing agents of this invention, various epoxy formulations employing diglycidyl ether of 4,4'-isopropylidene bisphenol were cured with various known polyoxypropylenepolyamines curing agents and various of the curing agents of this invention. Three drops of silicone fluid were added to each formulation to prevent formation of voids and bubbles. After degassing under vacuum, the formulations were oven cured at the conditions indicated in aluminum molds. The cured products were subjected to standard American Society for Testing Materials (ASTM) tests for Izod impact strength (ASTM designation D-256), flexural strength and modulus of elasticity in flexure (ASTM designation D 790-66), tensile strength and elongation at break (ASTM designation D-638-64 T), deflection temperature (ASTM designation D-648-56) and hardness (ASTM designation 2240-64 T). The tensile shear strength (ASTM D-1002-64) was measured on adhesive bonds. The abbreviations in the tables, pbw, psi and g. stand for parts by weight, pounds per square inch and grams, respectively.

EXAMPLES 9-12

In these examples epoxy castings were prepared wherein diglycidyl ether of 4,4'-isopropylidene bisphenol was cured with various polyoxypropylenepolyamine curing agents of different equivalent weights. The castings were subjected to the ASTM tests herein described and the data, which is for comparative purposes, is presented in the following Table I. The properties obtained from curing with these known polyoxypropylenepolyamine curing agents are adequate for many applications but extreme flexibility combined with high strength values are not exhibited by the cured samples listed in Table I. Curing with higher molecular polyoxypropylenepolyamines or with intermediate molecular weight blends of various polyoxypropylenepolyamines (Examples 11-12) provides flexibility and high impact resistance but very low physical strength.

TABLE I

| Example No. | 9 | 10 | 11 | 12 |
|---|---|---|---|---|
| Polyepoxide,[1] pbw | 100 | 100 | 100 | 100 |
| Polyoxypropylenepolyamine curing agent (approx. M.W.) | 240[4] | 400[5] | [6] | 2000[7] |
| Equiv. wt. | 64 | 105 | 153[6] | 500 |
| pbw | 30 | 50 | 75 | 265 |
| Curing Conditions | (2) | (2) | (3) | (3) |
| Physical Properties of Cured Casting | | | | |
| IZOD Impact Strength, ft. lbs/in | 1.42 | 0.53 | 10.0 | Too soft to be tested |
| Tensile Strength, psi | 10,300 | 8,310 | 1,720 | |
| Tensile Modulus, psi × 10$^{-5}$ | 3.91 | 4.21 | 0.16 | |
| Ultimate Elongation, % | 5.0 | 3.5 | 90 | |
| Flexural Strength, psi | 16,900 | 13,300 | — | |
| Flexural Modulus, psi × 10$^{-5}$ | 4.71 | 4.58 | — | |
| Deflection Temperature, °C., 264 psi/66 psi | 74/77 | 45/48 | 25/25 | |
| Hardness, 0-10 sec. Shore D | 88— | 85— | 75-55 | |

[1]Diglycidylether of 4,4' isopropylidene bisphenol (epoxide equiv. 190)
[2]2 hours at 100° C.
[3]2 hours at 80° C., followed by 3 hours at 125° C.
[4]Sold by Jefferson Chemical Company, Austin, Texas 78751 under the name "JEFFAMINE® D-230"
[5]Sold by Jefferson Chemical Company, Austin, Texas 78751 under the name "JEFFAMINE® D-400"
[6]A 60:40 blend of polyoxypropylenediamines of equiv. wt. 105 and equiv. wt. 500
[7]Sold by Jefferson Chemical Company, Austin, Texas 78751 under the name "JEFFAMINE® D-2000"

EXAMPLES 13-19

In these examples epoxy castings were prepared wherein diglycidyl ether of 4,4'-isopropylidene bisphenol was cured with a polyether urea product prepared according to Example 1. The polyether urea curing agent was employed as the sole curing agent and in various combinations with a polyoxypropylenepolyamine or approximately 400 molecular weight and with an equivalent weight of 105. The data presented in Table II shows generally that the polyurea curing agent greatly improves the tensile strength and ultimate elongation of the cured epoxy castings. Particularly effective were blends of the polyether urea and the polyoxypropylenepolyamine wherein there was achieved a significant increase in tensile shear strength and ultimate elongation with no loss in flexural strength. Example 19 represents an epoxy casting cured with a polyoxypropylenepolyamine having a molecular weight of 400 and an equivalent weight of 105, as the sole curing agent. The data, also shown in Table II, demonstrates that it has a rather poor tensile shear strength and a very low ultimate elongation.

TABLE II

| Example No. | 13 | 14 | 15 | 16 | 17 | 18 | 19 |
|---|---|---|---|---|---|---|---|
| Polyepoxide,[1] pbw | 100 | 100 | 100 | 100 | 100 | 100 | 100 |
| Curing Agent | | | | | | | |
| Polyurea/polyoxypropylenepolyamine[2] | 100/0 | 80/20 | 67/33 | 50/50 | 33/67 | 20/80 | 0/100 |
| Equiv. wt. of Blend | 218 | 179 | 161 | 141 | 127 | 118 | 105 |
| pbw | 114 | 94 | 84 | 74 | 67 | 62 | 50 |
| Physical Properties of Cured Casting | (3) | (4) | (4) | (4) | (4) | (4) | (4) |
| IZOD Impact Strength ft. lbs/in | 7.6 | 1.36 | 1.0 | 0.89 | 1.4 | 1.3 | 0.53 |
| Tensile Strength, psi | 2,520 | 2,850 | 2,920 | 4,950 | 5,060 | 6,320 | 8,310 |
| Tensile Shear, psi | 2,830 | 2,600 | 3,060 | 3,280 | 3,370 | 3,090 | 1,430 |
| Tensile Modulus, psi × 10$^{-5}$ | 0.76 | 0.94 | 1.53 | 2.76 | 2.81 | 3.40 | 4.21 |
| Ultimate Elongation, % | 95 | 101 | 88 | 62 | 65 | 12 | 3.5 |
| Flexural Strength, psi | 2,280 | 4,260 | 6,510 | 9,460 | 7,680 | 9,840 | 13,300 |
| Flexural Modulus, psi × 10$^{-5}$ | 1.12 | 1.56 | 2.36 | 3.29 | 2.66 | 3.20 | 4.58 |
| Deflection Temperature, °C., 264 psi/66 psi | 25/25 | 25/34 | 25/34 | 33/39 | 35/38 | 36/40 | 45/48 |
| Hardness, 0-10 sec. Shore D | 76-77 | 77-71 | 80-75 | 82-77 | 80-74 | 82-77 | 85— |
| Shore A$_2$ | 92-91 | — | — | — | — | — | — |

[1]Diglycidylether of 4,4' isopropylidene bisphenol
[2]Sold by Jefferson Chemical Company, Austin, Texas 78751 under the name "JEFFAMINE® D-400"
[3]Cured 3 hours at 80° C., 3 hours at 125° C.
[4]Cured 2 hours at 80° C., 3 hours at 125° C.

EXAMPLES 20-25

In these examples epoxy castings were prepared wherein diglycidyl ether of 4,4'-isopropylidene bisphenol was cured with the polyether urea having terminal amino groups prepared according to Example 2. The polyether urea curing agent was employed as the sole curing agent and in various combinations with polyoxypropylenepolyamines of molecular weight 400. The data presented in Table III show generally that the use of the polyether urea curing agent greatly improves the tensile shear strength and ultimate elongation of the cured epoxy castings. Particularly effective were blends of the polyurea and polyoxypropylenepolyamines.

TABLE III

| Example No. | 20 | 21 | 22 | 23 | 24 | 25 | 19 |
|---|---|---|---|---|---|---|---|
| Polyepoxide,[1] pbw | 100 | 100 | 100 | 100 | 100 | 100 | 100 |

TABLE III-continued

| Example No. | 20 | 21 | 22 | 23 | 24 | 25 | 19 |
|---|---|---|---|---|---|---|---|
| Curing Agent | | | | | | | |
| Polyurea/polyoxypropylenepolyamine[2] | 100/0 | 80/20 | 67/33 | 50/50 | 33/67 | 20/80 | 0/100 |
| Equiv. wt. of Blend | 406 | 257 | 213 | 167 | 139 | 123 | 105 |
| pbw | 213 | 135 | 112 | 87 | 73 | 65 | 50 |
| Physical Properties of Cured Casting | (3) | (4) | (4) | (4) | (4) | (4) | (4) |
| IZOD Impact Strength, ft. lbs./in. | — | 14.8 | 4.65 | 1.51 | 1.20 | 1.63 | 0.53 |
| Tensile Strength, psi | 564 | 1,120 | 1,690 | 3,140 | 5,390 | 7,390 | 8,310 |
| Tensile Shear, psi | 360 | 1,630 | 2,210 | 2,780 | 2,890 | 3,910 | 1,430 |
| Tensile Modulus, psi $\times 10^{-5}$ | — | — | 0.50 | 1.80 | 2.51 | 4.17 | 4.21 |
| Ultimate Elongation, % | 100 | 98 | 73 | 81 | 19 | 4.7 | 3.5 |
| Flexural Strength, psi | — | 7,240 | 3,030 | 9,880 | 13,220 | 11,730 | 13,300 |
| Flexural Modulus, psi $\times 10^{-5}$ | — | — | 1.02 | 3.08 | 4.09 | 3.78 | 4.58 |
| Deflection Temperature, °C., 264 psi/66 psi | — | 25/25 | 26/28 | 36/40 | 43/45 | 44/46 | 45/48 |
| Hardness, 0-10 sec. | | | | | | | |
| Shore D | 50-23 | 70-50 | 76-67 | 81-76 | 85-80 | 83-79 | 85— |
| Shore A$_2$ | 83-64 | 93-90 | 93-92 | 92—92 | — | — | — |

[1]Diglycidylether of 4,4′ isopropylidene bisphenol
[2]A polyoxypropylenepolyamine of approximately 400 molecular weight, sold under the name "JEFFAMINE® D-400" by Jefferson Chemical Company of Austin, Texas 78751.
[3]Cured 3 hours at 80° C., 3 hours at 125° C.
[4]Cured 2 hours at 80° C., 3 hours at 125° C.

EXAMPLES 26-30

In these examples epoxy castings were prepared wherein diglycidyl ether of 4,4′-isopropylidene bisphenol was cured with the polyether urea curing agent prepared according to Example 3. The data shown in Table IV demonstrate that the use of these polyether urea curing agents as a co-curing agent with polyoxypropylenepolyamine produces epoxy castings of improved physical properties.

TABLE IV

| Example No. | 26 | 27 | 28 | 29 | 30 | 19 |
|---|---|---|---|---|---|---|
| Polyepoxide,[1] pbw | 100 | 100 | 100 | 100 | 100 | 100 |
| Curing Agent | | | | | | |
| Polyurea[2]/polyoxypropylenepolyamine[3] | 100/0 | 80/20 | 50/50 | 33/67 | 20/80 | 0/100 |
| Equiv. wt. of Blend | 704 | 334 | 182 | 145 | 127 | 105 |
| pbw of Blend | 369 | 175 | 95 | 76 | 66 | 50 |
| Physical Properties of Cured Casting | (4) | (5) | (5) | (5) | (5) | (5) |
| IZOD Impact Strength, ft. lbs/in | — | — | 3.30 | 1.90 | 1.65 | 0.53 |
| Tensile Strength, psi | 271 | 590 | 2,560 | 3,920 | 6,300 | 8,310 |
| Tensile Shear, psi | 550 | 1,380 | 1,950 | 3,660 | 3,740 | 1,430 |
| Tensile Modulus, psi $\times 10^{-5}$ | — | — | 0.70 | 2.12 | 3.14 | 4.21 |
| Ultimate Elongation, % | 110 | 88 | 95 | 82 | 17.9 | 3.5 |
| Flexural Strength, psi | — | — | 4,240 | 10,020 | 13,030 | 13,300 |
| Flexural Modulus, psi $\times 10^{-5}$ | — | — | 1.33 | 3.14 | 4.20 | 4.58 |
| Deflection Temperature, °C., 264 psi/66 psi | — | — | 31/34 | 33/37 | 37/41 | 45/48 |
| Hardness, 0-10 sec. | | | | | | |
| Shore D | 30-18 | 53-30 | 77-70 | 80-76 | 83-87 | 85— |
| Shore A$_2$ | 56-50 | 93-78 | — | — | — | — |

[1]Diglycidylether of 4,4′ isopropylidene bisphenol
[2]Polyether urea of Example 3 (MW approximately 1,700)
[3]A polyoxypropylenepolyamine of approximately 400 molecular weight, sold under the name "JEFFAMINE® D-400" by Jefferson Chemical Company, Austin, Texas 78751
[4]Cured 3 hours at 80° C., 3 hours at 125° C.
[5]Cured 2 hours at 80° C., 3 hours at 125° C.

EXAMPLES 31-33

In these examples epoxy castings were prepared wherein diglycidyl ether of 4,4′-isopropylidene bisphenol was cured with the polyether urea of Example 3 in combination with a polyoxypropylenepolyamine having a molecular weight of about 240. The data, which are shown in Table V, demonstrate that the epoxy castings cured with these curing agent blends have excellent physical properties.

TABLE V

| Example No. | 31 | 32 | 33 |
|---|---|---|---|
| Polyepoxide,[1] pbw | 100 | 100 | 100 |
| Curing Agent | | | |
| Polyurea[2]/polyoxypropylenepolyamine[3] | 67/33 | 50/50 | 33/67 |
| Equiv. wt. of Blend | 161 | 118 | 91 |
| pbw | 84 | 62 | 48 |
| Physical Properties of Cured Casting [4] | | | |
| IZOD Impact Strength, ft. lbs/in | 1.79 | 1.32 | 1.30 |
| Tensile Strength, psi | 5,530 | 8,050 | 9,780 |
| Tensile Shear, psi | 3,740 | 4,150 | 4,480 |
| Tensile Modulus, psi × 10$^{-5}$ | 2.39 | 3.73 | 4.03 |
| Ultimate Elongation, % | 30 | 9.8 | 10 |
| Flexural Strength, psi | 9,740 | 13,070 | 14,570 |
| Flexural Modulus, psi × 10$^{-5}$ | 2.69 | 3.68 | 3.96 |
| Deflection Temperature, °C., 264 psi/66 psi | 44/53 | 56/64 | 65/68 |
| Hardness, 0-10 sec. | | | |
| Shore D | 85-80 | 85-83 | 86-83 |
| Shore A$_2$ | — | — | — |

[1] Diglycidylether of 4,4' isopropylidene bisphenol
[2] Polyether urea of Example 3 (MW approximately 1,700)
[3] A polyoxypropylenediamine of approximately 240 molecular weight, sold under the name "JEFFAMINE®D-230" by Jefferson Chemical Company, Austin, Texas 78751
[4] Cured 2 hours at 80° C., 3 hours at 125° C.

EXAMPLES 34-36

In these examples epoxy castings were prepared employing the polyether ureas of Example 4 and Example 5. The physical properties of those castings are presented in Table VI.

TABLE VI

| Example No. | 34 | 35 | 36 |
|---|---|---|---|
| Polyepoxide,[1] pbw | 100 | 100 | 100 |
| Curing Agent | | | |
| Polyurea/polyoxypropylenepolyamine[2] | 100/0[3] | 80/20[3] | 20/80[4] |
| Equiv. wt. of Blend pbw | 60 | 60 | 67 |
| Physical Properties of Cured Casting[5] | | | |
| IZOD Impact Strength, ft. lbs/in | 0.80 | 0.92 | 2.47 |
| Tensile Strength, psi | 9,560 | 9,350 | 2,960 |
| Tensile Shear, psi | — | — | — |
| Tensile Modulus, psi × 10$^{-5}$ | 4.15 | 3.95 | 1.40 |
| Ultimate Elongation, % | 7.6 | 12.8 | 80 |
| Flexural Strength, psi | 16,010 | 15,810 | 4,930 |
| Flexural Modulus, psi × 10$^{-5}$ | — | — | — |
| Deflection Temperature, °C., 264 psi/66 psi | 63/67 | 60/62 | 29/36 |
| Hardness, 0-10 sec | | | |
| Shore D | 88-85 | 88-84 | 78-73 |
| Shore A$_2$ | — | — | — |

[1] Diglycidylether of 4,4' isopropylidene bisphenol
[2] A polyoxypropylenediamine of approximately 400 moleecular weight, sold under the name "JEFFAMINE® D-400" by Jefferson Chemical Company, Austin, Texas 78751
[3] The polyether urea is that of Example 4 (MW approximately 440)
[4] The polyether urea is that of Example 5 (MW approximately 3300)
[5] Cured 2 hours at 80° C., 3 hours at 125° C.

EXAMPLES 37-42

In these examples epoxy castings were prepared employing various polyether urea curing agents of this invention which were prepared by reaction of a polyoxypropylenepolyamine with a bifunctional isocyanate obtained by reaction of aniline and formaldehyde. These polyether polyureas were prepared as described in Examples 6-8. The excellent physical properties of these epoxy castings are presented in the following Table VII.

TABLE VII

| Example No. | 37 | 38 | 39 | 40 | 41 | 42 |
|---|---|---|---|---|---|---|
| Polyepoxide,[1] pbw | 100 | 100 | 100 | 100 | 100 | 100 |
| Curing Agent | | | | | | |
| Polyurea | (2) | (2) | (3) | (3) | (4) | (4) |
| Polyurea/polyoxypropylenepolyamine[5] | 100/0 | 50/50 | 100/0 | 50/50 | 100/0 | 50/50 |
| Equiv. wt. (Condensate or Blend) | 185 | 133 | 246 | 147 | 311 | 156 |
| pbw | 97 | 70 | 130 | 76 | 163 | 82 |
| Physical Properties of Cured Casting[6] | | | | | | |
| IZOD Impact Strength, ft. lbs/in | 1.03 | 1.16 | 0.98 | 0.96 | 1.03 | 1.40 |
| Tensile Strength, psi | 7,340 | 7,940 | 5,740 | 7,390 | 5,160 | 6,400 |
| Tensile Shear, psi | 3,570 | 4,040 | 3,610 | 3,960 | 3,910 | 3,760 |
| Tensile Modulus, psi × 10$^{-5}$ | 3.7 | 3.8 | 2.69 | 3.71 | 2.51 | 3.35 |
| Ultimate Elongation, % | 8.2 | 4.9 | 75 | 4.0 | 72 | 12.5 |
| Flexural Strength, psi | 11,720 | 16,580 | 9,320 | 16,010 | 8,600 | 13,740 |
| Flexural Modulus, psi × 10$^{-5}$ | 3.69 | 5.21 | 2.80 | 5.0 | 2.54 | 4.27 |
| Deflection Temperature, °C. 264 psi/66 psi | 42/45 | 42/45 | 40/43 | 42/44 | 38/42 | 42/44 |
| Hardness, 0-10 sec. | | | | | | |

TABLE VII-continued

| Example No. | 37 | 38 | 39 | 40 | 41 | 42 |
|---|---|---|---|---|---|---|
| Shore D | 84–79 | 85–81 | 84–79 | 81–79 | 84–80 | 84–81 |

(1)Diglycidylether of 4,4' isopropylidene bisphenol
(2)Polyether urea of Example 6
(3)Polyether urea of Example 7
(4)Polyether urea of Example 8
(5)A polyoxypropylenediamine of approximately 400 molecular weight, sold under the name of "JEFFAMINE® D-400" by Jefferson Chemical Company, Austin, Texas 78751
(6)Cured 2 hours at 80° C., 3 hours at 125° C.

EXAMPLE 43

In this example polyether urea was prepared in accordance with the invention by reacting a polyoxyethylenepolyamine with urea.

Into a suitable reaction vessel were added 150 g. (1.0 moles) of a polyoxyethylenepolyamine having terminal primary amino groups and having a molecular weight of approximately 650, sold under the name "JEFFAMINE® ED 600" by Jefferson Chemical Company, Austin, Texas 78751 and 36 g. (0.6 moles) of urea. The mixture was heated gradually to 198° and held at this temperature until the emission of ammonia had ceased. The reaction mixture was then stripped at 150° C./0.5 mm. Hg. A viscous liquid polyether urea having terminal primary amino groups was obtained. The liquid polyether urea had an osmometric molecular weight of 1,000 which upon analysis showed the following: total amine 1.31 meq./g., primary amine 1.19 meq./g.

EXAMPLES 44–47

In these examples, epoxy castings were prepared employing the polyether urea curing agent prepared in accordance with Example 43 with a polyoxypolyamine co-curing agent. The physical properties of these epoxy castings are presented in Table VIII.

TABLE VIII

| Example No. | 44 | 45 | 46 | 47 |
|---|---|---|---|---|
| Polyepoxide,(1) pbw Curing Agent | 100 | 100 | 100 | 100 |
| Polyether urea(2)/polypropylenepolyamine(3) | 70/30 | 50/50 | 20/80 | 0/100 |
| Equiv. wt. (Concentrated Blend) | 147 | 102 | 70 | 58 |
| Total Amount of Curative, pbw. | 79 | 55 | 37.7 | 30 |
| Physical Properties of Cured Casting(4) | | | | |
| IZOD Impact Strength, ft. lbs./in. | 3.84 | 1.49 | 1.26 | 1.42 |
| Deflection Temperature, °C., 264 psi/66 psi | 22/26 | 47.5/50 | 70.5/75 | 73.5/77 |
| Hardness, 0-10 sec.(5) | 75–69 | 81–79 | 84–82 | 88 |
| Ultimate Elongation, % | 80 | 11.5 | 12.2 | 5.0 |
| Tensile Shear Strength, psi | 2,420 | 4,690 | 4,320 | 1,130 |

(1)Diglycidyl ether of 4,4'-isopropylidene bisphenol.
(2)The polyether urea of Example 43.
(3)A polyoxypropylenepolyamine having an equivalent weight of 58 and molecular weight of about 240, sold under the name JEFFAMINE® D-230, by Jefferson Chemical Co., Inc., Austin, Texas 78751.
(4)Cure cycle: 2 hours, 80° C.; 3 hours, 125° C.
(5)D shore.

While the invention has been explained in relation to its preferred embodiment, it is to be understood that various modifications thereof will become apparent to those skilled in the art upon reading the specification and is intended to cover such modifications as fall within the scope of the appended claims.

We claim:

1. A curable epoxy resin composition consisting essentially of:
   a vicinal polyepoxide; and,
   an effective amount of a polyether urea curing agent having terminal primary amino groups and being formed by the reaction of a compound selected from a group consisting of bifunctional isocyanates obtained by phosgenation of an aniline formaldehyde condensation product with a polyoxyalkylenepolyamine of the formula:

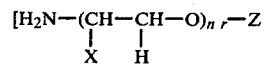

wherein X is a hydrogen, a methyl radical, or an ethyl radical; Z is a hydrocarbon radical having 2 to 5 carbon atoms forming from 2 to 4 external ether linkages, n is a number from 1 to about 15, and r is a number from 2 to 4 wherein the molar ratio of said isocyanate compound to said polyoxyalkylenepolyamine is from 0.25 to 0.50.

2. The curable epoxy resin composition of claim 1 wherein said polyoxyalkylenepolyamine is a polyoxypropylenepolyamine having a molecular weight of from about 200–2000.

3. The curable epoxy resin composition of claim 1 wherein said polyether urea curing agent is employed in combination with an effective amount of a co-curing agent selected from a group consisting of aliphatic polyamines, aromatic polyamines and polyoxyalkylenepolyamines.

4. The curable epoxy resin composition of claim 3 wherein said co-curing agent is a polyoxyalkylenepolyamine and is present in an amount of from about 5:1 to 1:5 by weight of said polyether urea curing agent.

5. The curable epoxy resin composition of claim 4 wherein said co-curing agent is a polyoxypropylenepolyamine having a molecular weight of from about 200–2000.

6. A curable epoxy resin composition consisting essentially of:
   a vicinal polyepoxide; and,
   an effective amount of a polyether urea curing agent of the formula:

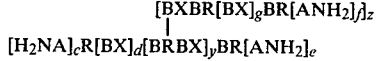

wherein A is a polyoxyalkylene radical containing from about 1 to about 15 oxyalkylene groups wherein each oxyalkylene group contains from 2 to about 4 carbon atoms; R is a hydrocarbon radical containing from 2 to 5 carbon atoms and forming from 2 to 4 oxycarbon linkages with A and B; B is a polyoxyalkylene amino radical containing from about 1 to 15 oxyalkylene groups wherein each oxyalkylene group contains from 2 to about 4 carbon atoms; X is a radical derived from a bifunctional isocyanate obtained by the phosgenation of an aniline formaldehyde condensation product having two

groups; c and d are from 1 to 3 and chosen so that their sum is from 2 to 4; e is a number from 1 to 3; f is a number from 1 to 3; g is a number from 1 to 3; y is a number from 0 to about 5; z is a number from 0 to 2.

7. The curable epoxy resin composition of claim 6 where A corresponds to the formula:

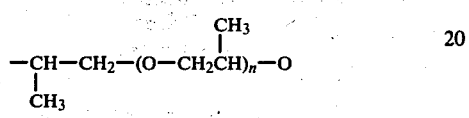

wherein n is a number from 0 to 15; B corresponds to the formula:

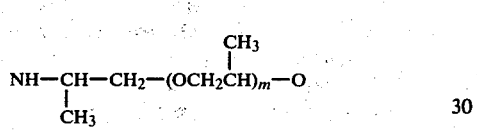

wherein m is a number from 0 to 15; c and d are from 1 to 2 and chosen so that their sum is from 2 to 3; e is a number from 1 to 2; g is a number from 1 to 2; f is a number from 1 to 2; z is a number from 0 to 1; y is a number from 1 to 4; and x is a radical selected from a group consisting of

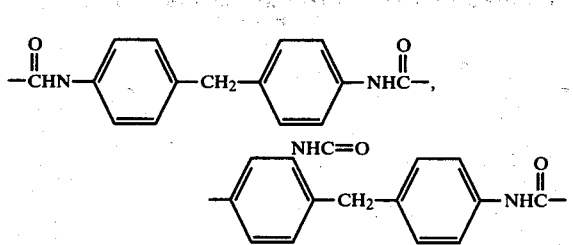

and mixtures thereof.

8. The curable epoxy resin composition of claim 7 wherein n and m are, independently, numbers from about 1 to 10.

9. The curable epoxy resin composition of claim 6 wherein the amount of polyether urea curing agent to polyepoxide is that amount required such that the total number of amine equivalents is from about 0.8 to about 1.2 times the number of epoxide equivalents present.

10. The curable epoxy resin composition of claim 9 wherein said amine equivalent and said epoxide equivalents are present in a ratio of 1:1.

11. The curable epoxy resin composition of claim 6 further consisting essentially of:
an effective amount of additive selected from a group consisting of conventional pigments, dyes, fillers, flame retardant agents, compatible natural resins and compatible synthetic resins.

12. The curable epoxy resin composition of claim 6 wherein said polyether urea curing agent is employed in combination with an effective amount of a co-curing agent selected from a group consisting of aliphatic polyamines, aromatic polyamines, and polyoxyalkylenepolyamine.

13. The curable epoxy resin composition of claim 12 wherein said co-curing agent is a polyoxyalkylenepolyamine which is present in an amount of from about 5:1 to 1:5 by weight of said polyether urea curing agent.

14. The curable epoxy resin composition of claim 13 wherein said co-curing agent is a polyoxypropylenepolyamine.

15. An epoxy resin curing agent for curing vicinal epoxy resins consisting essentially of:
a polyether urea having terminal primary amino groups and being formed by the reaction of a compound selected from a group consisting of bifunctional isocyanates obtained by the phosgenation of an aniline formaldehyde condensation product with a polyoxyalkylenepolyamine of the formula:

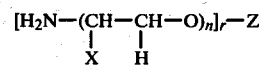

wherein X is a hydrogen, a methyl radical, or an ethyl radical; Z is a hydrocarbon radical having 2 to 5 carbon atoms forming from 2 to 4 external ether linkages; n is a number from 1 to about 15; and r is a number from 2 to 4 wherein the molar ratio of said isocyanate compound to said polyoxyalkylenepolyamine is from 0.25 to 0.50.

16. The epoxy resin curing agent of claim 15 wherein said polyoxyalkylenepolyamine is a polyoxypropylenepolyamine having a molecular weight of from about 200-2000.

17. The epoxy resin curing agent of claim 15 wherein said bifunctional isocyanates are selected from a group consisting of 4,4'-diphenylmethane diisocyanate, 2,4'-diphenylmethane diisocyanate, and mixtures thereof.

18. An epoxy resin curing agent consisting essentially of
a polyether urea of the formula:

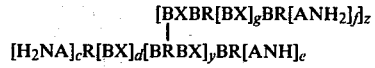

wherein A is a polyoxyalkylene radical containing from about 1 to about 15 oxyalkylene groups wherein each oxyalkylene group contains from 2 to about 4 carbon atoms; R is a hydrocarbon radical containing from 2 to 5 carbon atoms forming from 2 to 4 oxycarbon linkages with A and B; B is a polyoxyalkylene amino radical containing from about 1 to 15 oxyalkylene groups wherein each oxyalkylene group contains from 2 to about 4 carbon atoms; X is a radical derived from a bifunctional isocyanate obtained by the phosgenation of an aniline formaldehyde condensation product having two

groups; c and d are from 1 to 3 and chosen so that their sum is from 2 to 4; e is a number from 1 to 3; f is a number from 1 to 3; g is a number from 1 to 3; y is a number from 0 to 5; z is a number from 0 to 2.

19. The epoxy resin curing agent of claim 18 where X is the radical selected from a group consisting of

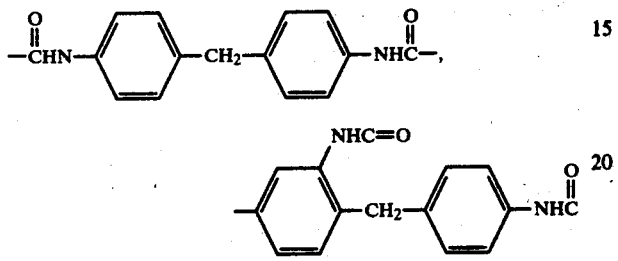

and mixtures thereof.

20. The epoxy resin curing agent of claim 18 where A corresponds to the formula:

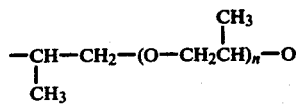

wherein n is a number from 0 to 15; B corresponds to the formula:

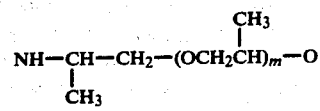

wherein m is a number from 0 to 15; c and d are 1 to 2 chosen so that their sum is from 2 to 3; e is a number from 1 to 2; g is a number from 1 to 2; f is a number from 1 to 2; z is a number from 0 to 1; and y is a number from 1 to 4.

21. The epoxy resin curing agent of claim 20 wherein n and m are, independently, numbers from about 1 to 10.

22. A process for preparing a polyether urea having terminal primary amino groups comprising the steps of:
reacting, at temperatures of 245° C. to 250° C. a compound selected from a group consisting of bifunctional isocyanates obtained by the phosgenation of an aniline formaldehyde condensation product with a polyoxyalkylenepolyamine of the formula:

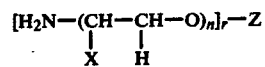

wherein X is a hydrogen, a methyl radical, or an ethyl radical, Z is a hydrocarbon radical having 2 to 5 carbon atoms forming from 2 to 4 external ether linkages, n is a number from 1 to about 15; and r is a number from 2 to 4; wherein the molar ratio of said isocyanate to polyoxyalkylenepolyamine is from 0.25 to 0.50 and,
recovering said polyether urea from the reaction mixture.

23. The process of claim 22 wherein said compound is a bifunctional isocyanate selected from a group consisting of 4,4'-diphenylmethane diisocyanate, 2,4'-diphenylmethane diisocyanate, and mixtures thereof.

* * * * *